Patented July 14, 1931

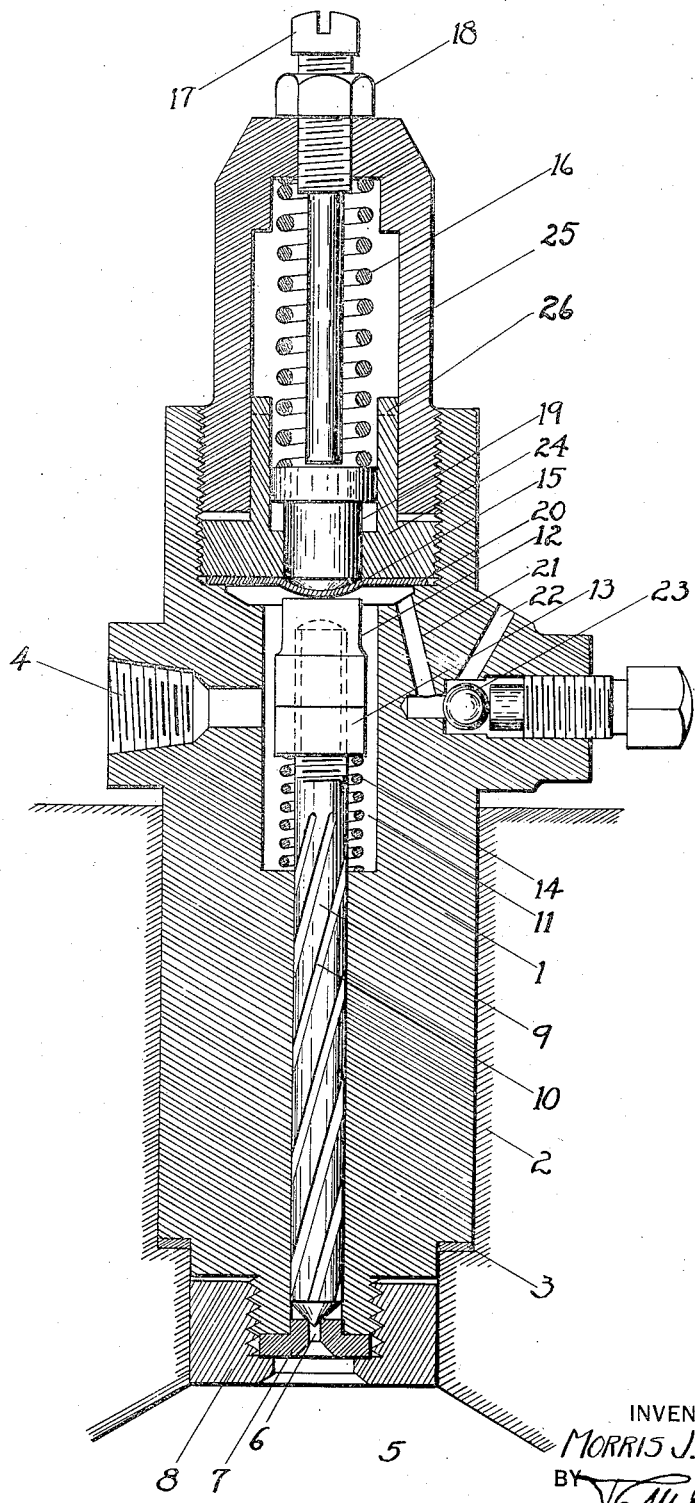

1,814,443

UNITED STATES PATENT OFFICE

MORRIS J. GOLDBERG, OF BELOIT, WISCONSIN, ASSIGNOR TO FAIRBANKS, MORSE & CO., OF CHICAGO, ILLINOIS, A CORPORATION OF ILLINOIS

FUEL INJECTOR FOR OIL ENGINES

Application filed September 24, 1923. Serial No. 664,479.

My invention relates to improvements in fuel injectors for oil engines.

One of the principal objects of this device is to shut off the orifice, through which the oil passes to the engine, very promptly on the completion of stroke of the pump which forces the oil through the injector, thereby preventing, as far as possible, the dribbling of oil out of this orifice after the source of the introducing pressure ceases to act. Another object is to bring this point of shut off of the oil as close down to the wall of the combustion chamber as possible. Another object is to facilitate the use of rather high injecting oil pressures that result in fine atomization.

Though my invention consists largely in the construction and arrangement of parts hereinafter described and particularly pointed out in the claims, yet I do not limit my invention to the precise form, construction or arrangement of parts shown or the several parts thereof, inasmuch as various alterations may be made without departing from the scope of my invention.

The body of the injector (1) is positioned in the wall of the combustion chamber (2) in any suitable manner, gasket (3) being preferably used to seal the joint between the two. The fuel oil from the injection pump enters at (4) and passes out into the combustion chamber (5) at orifice (6), this orifice proferably being made in a small removable piece (7) retained in place by cap (8), screwed fast to the body of the injector. A central valve (9), preferably made cylindrical in shape with flutes (10) either straight or spiral cut, provides passage for the oil from chamber (11), which the oil first enters, to orifice (6) where it leaves. Valve (9) preferably has a point closing the orifice (6), and is preferably made with an adjustment in length consisting of a cap nut (12) screwing on to the stem and a lock nut (13) to hold this from unscrewing. Spring (14) urges the valve (9) away from its seat at orifice (6) and tends to hold it against the lower face of a diaphragm (15), preferably metallic. Above this diaphragm is a spring (16) bearing against the upper face of the diaphragm through a movable member (19) which may be of any suitable size or shape and preferably riding in a bearing surface such as in bearing member (24). The diaphragm is preferably sealed at joint (20) to prevent leakage of oil. A stop screw (17) with jam nut (18) may be used to adjustably limit the upward movement of the diaphragm and of the valve (9) below it. It will be seen that the lower surface of the bearing member (24) serves as a means for strengthening diaphragm (15) and, by limiting its upward movement, greatly increases the life of the diaphragm.

In operation it will be seen that the pressure of oil from the pump introduced at (4) into recess (11) will act on the diaphragm to raise it, this permitting valve (9) to open by following the diaphragm under the influence of spring (14) which is heavy enough to overcome the tendency of the valve to stay shut under the influence of the pressure of the oil on the area of the orifice (6). Immediately on the withdrawal of the pressure of the oil, the valve will be quickly forced shut by spring (16) which considerably overbalances the tension of spring (14) acting against it. An opening may be provided out of recess (11) by hole (21) leading to the atmosphere at (22) after passing through a shut-off valve (23). This valve is normally kept closed but is opened whenever it may be desired to open the injection line for any purpose, but more usually for the withdrawal of air that may become trapped. Opening (22) from this vent would, in some cases, be piped away.

Having described my invention, what I claim as new and desire to secure by Letters Patent, is:

1. In a diaphragm-type injector for solid-injection engines, a diaphragm arranged for movement responsive to fuel discharge by the injector, means forming a metallic reinforcement for all parts of the diaphragm, on one side thereof, an endwise movable valve member on the opposite side of the diaphragm, a spring carried by the valve member and tending to bias the member toward open position, screw threaded means disposed between the valve member and diaphragm, and adapted for adjusting the effective length of the valve member and loading of said spring, and means for yieldably urging the valve member toward closed position.

2. In a diaphragm-type injector for solid-injection engines, including a hollow body, a diaphragm disposed therein and arranged for movement responsively to differences in fuel pressure, a plunger engaging the diaphragm, a spring tending to bias said plunger toward the diaphragm, an apertured plug removably disposed within the body, and forming a guide for movement of the plunger, means, formed by said plug and plunger, for completely reinforcing one side of the diaphragm; a valve member on the opposite side of the diaphragm, a second spring carried by said valve member and opposing said first named spring, an adjusting nut engaging the diaphragm and valve member, and adapted for adjusting the effective length of the valve member and the loading of each of said springs, and means for limiting the outward movement of said plunger.

3. In a diaphragm-type injector for solid injection engines, including a hollow body, a diaphragm disposed in the body and arranged for movement to permit fuel discharge, a plunger engaging the diaphragm, a spring arranged to bias the plunger toward the diaphragm, an apertured sleeve removably disposed within the body and forming a bearing surface for sliding movement of the plunger, and means, constituted by said plunger and sleeve, forming a reinforcing structure coextensive with one side of the diaphragm, an endwise movable valve member disposed on the opposite side of the diaphragm, a second spring of lesser loading than said first named spring, carried by the valve member and opposing said first named spring, an adjusting nut carried by the valve member and abutting the diaphragm, adapted for altering the effective length of the valve member and the loading of both springs, means for locking said nut in its adjusted positions, and a threadedly adjustable stop for limiting the outward movement of said plunger, independently of the adjustment of the plunger spring.

MORRIS J. GOLDBERG.